(12) United States Patent
Farhat

(10) Patent No.: US 11,303,961 B1
(45) Date of Patent: Apr. 12, 2022

(54) SECURE CONTENT SCREENING RESEARCH AND ANALYSIS SYSTEM AND PROCESS FOR SECURELY CONDUCTING LIVE AUDIENCE TEST SCREENINGS AND HOSTING FOCUS GROUPS FOR MEDIA CONTENT MARKET RESEARCH

(71) Applicant: Jon A Farhat, Burbank, CA (US)

(72) Inventor: Jon A Farhat, Burbank, CA (US)

( * ) Notice: Subject to any disclaimer, the term of this patent is extended or adjusted under 35 U.S.C. 154(b) by 0 days.

(21) Appl. No.: 17/143,859

(22) Filed: Jan. 7, 2021

(51) Int. Cl.
*H04N 21/442* (2011.01)
*G06Q 30/02* (2012.01)
*H04N 21/8358* (2011.01)
*H04L 65/4038* (2022.01)

(52) U.S. Cl.
CPC ... *H04N 21/44218* (2013.01); *G06Q 30/0201* (2013.01); *H04N 21/8358* (2013.01); *H04L 65/4038* (2013.01)

(58) Field of Classification Search
CPC .............................................. H04N 21/44218
See application file for complete search history.

(56) References Cited

U.S. PATENT DOCUMENTS

2014/0137142 A1* 5/2014 Yeh ...................... H04N 21/812
725/10

* cited by examiner

*Primary Examiner* — Michael H Hong
(74) *Attorney, Agent, or Firm* — Plager Schack LLP; Mark H. Plager; Stephen Hallberg

(57) ABSTRACT

A secure content screening research and analysis system and process for securely conducting live audience test screenings and hosting focus groups for media content market research is disclosed. The secure content screening research and analysis system and process allows one to deploy extreme content security measures to stream sensitive content, such as in-progress films, to groups of public viewers to engage viewers in the groups in audience test screenings of such sensitive content and to perform research and analysis of viewer reactions while watching the content for media content market research. The secure content screening research and analysis system and process utilizes industry standard DRM to enforce a requirement of recording via web cam of each user watching the content and placing this information along the same presented content timeline for specific analysis of every scene's effect on the viewer.

10 Claims, 4 Drawing Sheets

SECURE CONTENT SCREENING RESEARCH AND ANALYSIS SYSTEM AND PROCESS FOR SECURELY CONDUCTING LIVE AUDIENCE TEST SCREENINGS AND HOSTING FOCUS GROUPS FOR MEDIA CONTENT MARKET RESEARCH

BACKGROUND

Embodiments of the invention described in this specification relate generally to media content audience test screenings and research, and more particularly, to a secure content screening research and analysis system and process for securely conducting live audience test screenings and hosting focus groups for media content market research.

Conducting audience research test screenings has for years been done in-person. Now, with social-distancing clearly a new normal, the old methods of studying the collective audience reaction is not possible. Such research is used by producers and filmmakers to finalize the product for distribution and marketing.

Therefore, what is needed is a way to deploy extreme content security measures to stream sensitive content, such as in-progress movie and television, to groups of public viewers to engage viewers in the groups in audience test screenings of such sensitive content and to perform research and analysis of viewer reactions while watching the content for media content market research.

BRIEF DESCRIPTION

A novel secure content screening research and analysis system and process for securely conducting live audience test screenings and hosting focus groups for media content market research is disclosed. In some embodiments, the secure content screening research and analysis system and process allows one to deploy extreme content security measures to stream sensitive content, such as in-progress films, to groups of public viewers to engage viewers in the groups in audience test screenings of such sensitive content and to perform research and analysis of viewer reactions while watching the content for media content market research. In some embodiments, the secure content screening research and analysis system and process utilizes industry standard Digital Rights Management ("DRM") to enforce several process requirements including at least a requirement of recording via web cam of each user watching the content and then placing each viewer's recorded media along the same presented content timeline for specific analysis of every scene's effect on the viewer.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
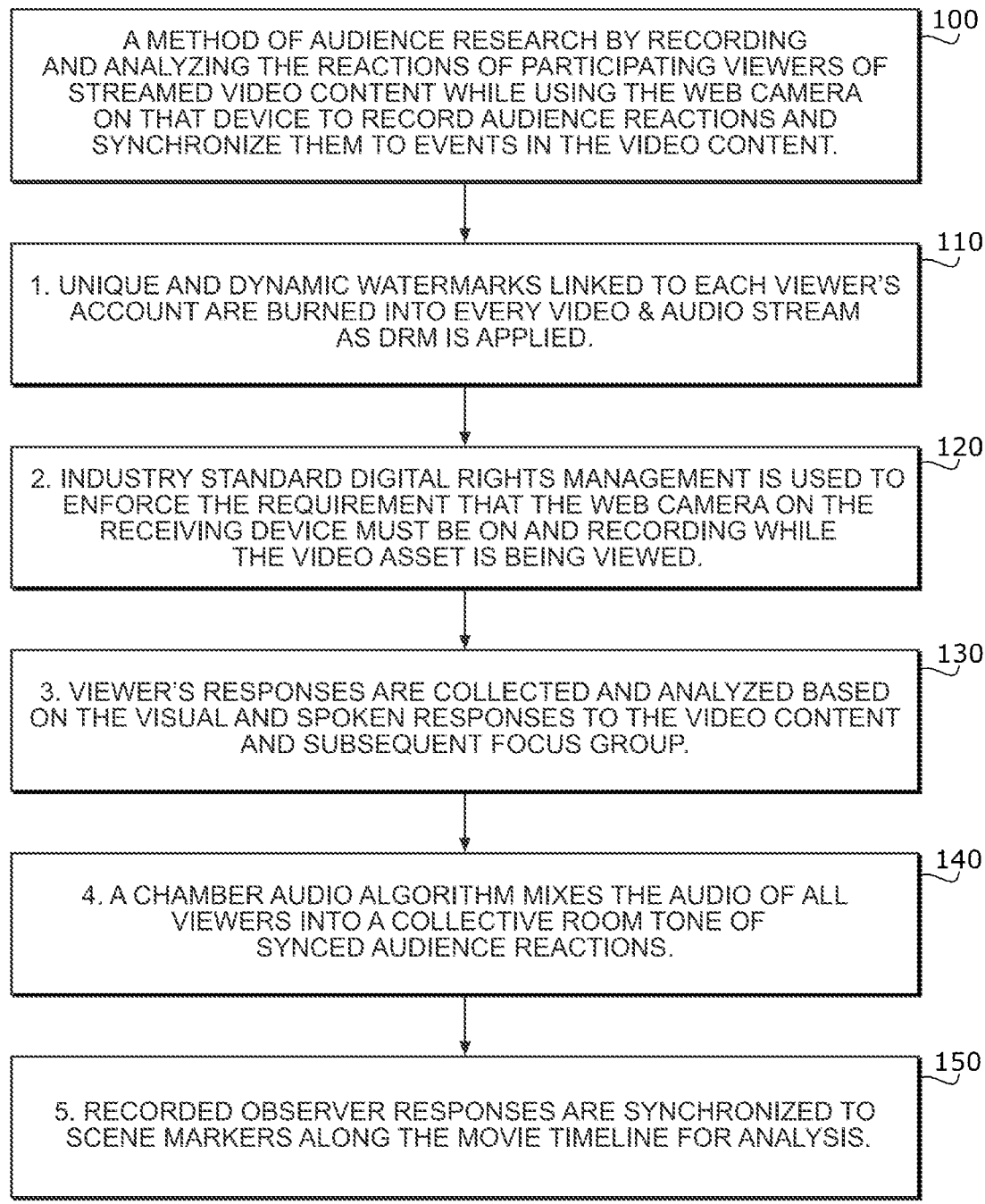
FIG. 1 conceptually illustrates a high-level secure content screening research and analysis process for securely conducting live audience test screenings and hosting focus groups for media content market research in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments include a secure content screening research and analysis system and process for securely conducting live audience test screenings and hosting focus groups for media content market research. In some embodiments, the secure content screening research and analysis system and process allows one to deploy extreme content security measures to stream sensitive content, such as in-progress movies and television, to groups of public viewers to engage viewers in the groups in audience test screenings of such sensitive content and to perform research and analysis of viewer reactions while watching the content for media content market research. In some embodiments, the secure content screening research and analysis system and process utilizes DRM to enforce a requirement of recording via web cam of each user watching the content and placing this information along the same presented content timeline for specific analysis of every scene's effect on the viewer.

Embodiments of the secure content screening research and analysis system and process for securely conducting live audience test screenings and hosting focus groups for media content market research described in this specification solve the problems noted above by securely streaming content live only while a web camera of a participant viewer's content viewing device (which is receiving the content stream) is active (powered on and ready to capture video of the participant), and by returning a live feed of the reactions of the participant as he or she watches the content stream, and thereafter conducting test screening research of all audience participants. Specifically, with hundreds of viewers watching the streamed media together, live audience reactions are recorded and mixed into a room tone of collective reaction (e.g., audience laughter while watching a comedy) that is delivered back to each participating viewer. Also, recorded facial reactions to the media are persisted in a database and analyzed to develop presentation strategies.

Embodiments of the secure content screening research and analysis system and process for securely conducting live audience test screenings and hosting focus groups for media content market research described in this specification differ from and improve upon currently existing options. In particular, currently there is nothing in the field or marketplace that addresses the problems of securing streaming sensitive content, lack of in-person and controlled focus groups, and socially-distanced social studies, etc. This consequently hinders media marketing and distribution planning, and often results in failures in the marketplace by misjudging the audience. By contrast, the secure content screening research and analysis system and process for securely conducting live audience test screenings and hosting focus groups for media content market research uses industry standard Digital Rights Management ("DRM") security mechanisms to enforce the method of recording users while they watch content and placing this information along the same presented content timeline for specific analysis of every scene's effect on the viewer.

The secure content screening research and analysis system and process for securely conducting live audience test screenings and hosting focus groups for media content market research of the present disclosure may be comprised of the following elements.

1. Every individually targeted media stream is embedded with a unique visual and audio identifier code before it leaves the server.

2. The Web Camera on the receiving device must be on and recording in order for the media content stream to be watched.

3. The Viewer's live image and audio are recorded and synchronized to their respectively viewed scenes according to their position within the movie.

4. All individual audio from all viewers is mixed into a room tone of collective reaction ("collective room tone"), such as laughter in a comedy. This group reaction is then fed back to the viewer in real time.

5. Recorded observer responses are synchronized to scene markers along the movie or media timeline for analysis.

The secure content screening research and analysis system and process for securely conducting live audience test screenings and hosting focus groups for media content market research of the present disclosure generally works by these components operating together in the back-end of the application, allowing the viewer little or no distraction as the movie (or other content) is playing. As they laugh or scream based on the story, they hear the hundreds of other audience members at the same time. Since the media is being played live for all viewers, their individual and collective responses that are recorded via their web camera are mixed and analyzed by a number of factors. Once the movie (or other content) is over, selected audience member viewers are invited to participate in a smaller and moderated focus group where they can see and hear each other and respond to questions of the moderator. All of this is recorded and analyzed and presented to the content producers to help finish the media product. However, the key is that the media content item (e.g., the movie) will not stream for the user, unless the web camera on the user's viewing device is powered on and is active (able to capture video of the user), and our servers are recording.

By way of example, FIG. 1 conceptually illustrates a high-level secure content screening research and analysis process 100 for securely conducting live audience test screenings and hosting focus groups for media content market research. As shown in this figure, the high-level secure content screening research and analysis process 100 starts by linking unique and dynamically-generated watermarks to each viewer's account and burning the watermarks into every video and audio stream as DRM is applied (at 110). Next, the high-level secure content screening research and analysis process 100 uses industry standard DRM to enforce a requirement for viewing and listening to the video and audio stream which is that the web cam on the user's viewing device must be recording the viewer as he or she is playing back the video (at 120). The high-level secure content screening research and analysis process 100 then performs collection and analysis of viewer responses from the captured videos from the web cams, as well as any spoken or audible responses to the video content being viewed, with follow-up, subsequent focus group (at 130). Then the high-level secure content screening research and analysis process 100 uses a chamber audio algorithm to mix the audio of all viewers into a collective room tone of synchronized audience reactions (at 140). Finally, the high-level secure content screening research and analysis process 100 synchronizes the recorded viewer responses to scene markers along a timeline of the streamed content item (e.g., a movie) for further analysis (at 150).

Figure 2:
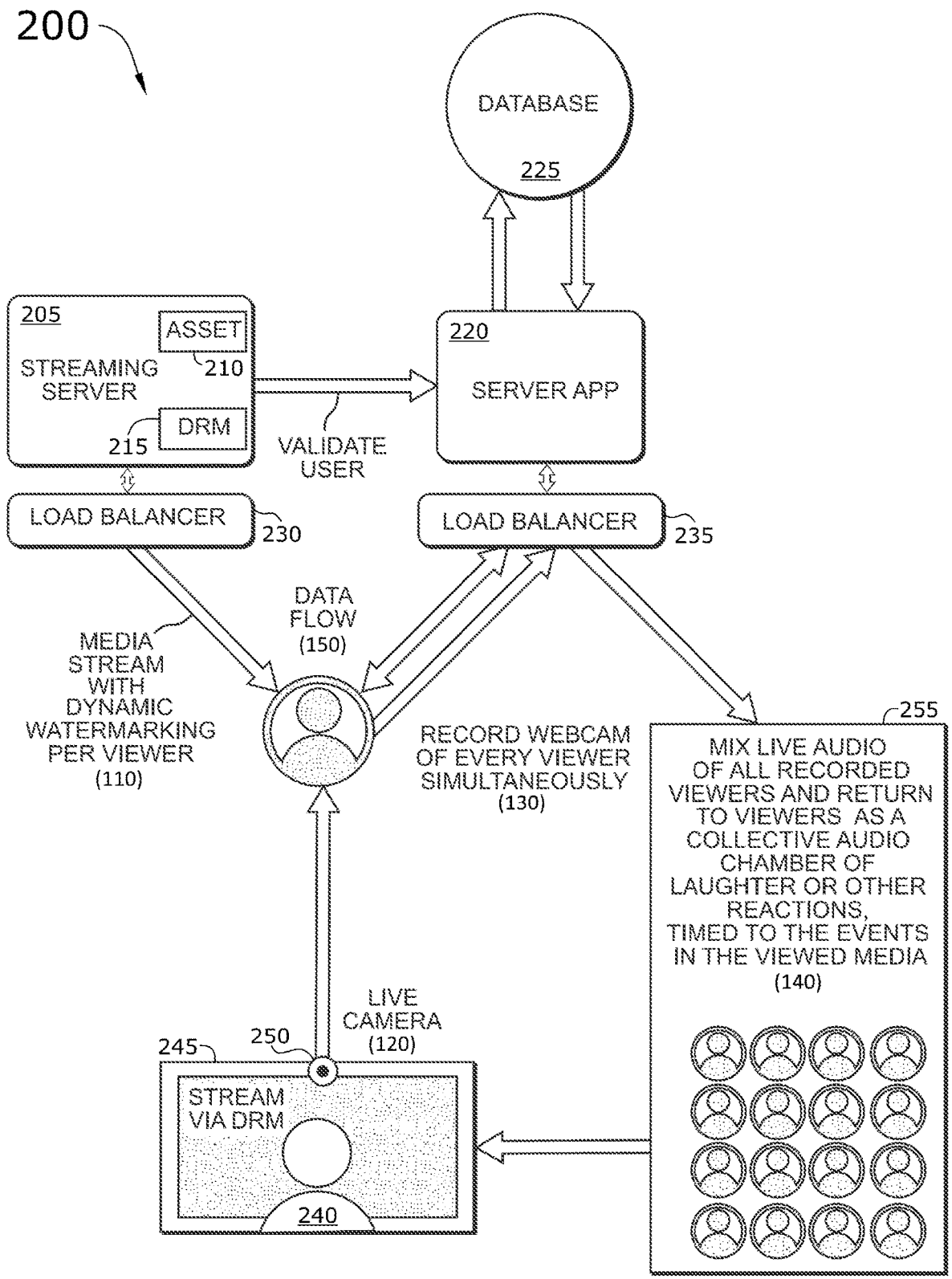
FIG. 2 conceptually illustrates secure content screening research and analysis system in some embodiments.

Turning to another example, FIG. 2 conceptually illustrates a secure content screening research and analysis system 200. As shown in this figure, the secure content screening research and analysis system 200 includes a streaming server 205 that includes at least one media content asset 210 to be streamed and DRM module 215 that enforces DRM rights, a server app 220 which engages in user authentication and validation on behalf of the streaming server 205, a database 225 for storing all captured video and audio of participating users and content items that are or will be streamed for viewing, a first load balancer 230 connected to the streaming server 205, a second load balancer 235 connected to the server app 220, an exemplary user 240, a user viewing device 245 that receives and displays the streamed content for viewing by the user 240, a web camera 250, and a chamber audio mixing module 255 the mixes live audio of all recorded viewers and returns to the viewers as a collective audio chamber of collective viewer reactions, timed to the events in the streamed content being viewed. Thus, the streaming server 205 provides the media content asset 210 to the first load balancer 230 to stream to viewers. However, the media content asset 210 is only streamed to viewers after authentication and validation of the user 240, such that dynamic watermarking can be burned into the streamed content for the user 240 and each other user has their own dynamic and unique watermark. Also, the streaming server 205 will not stream the content asset 210 to the user 240 unless the web cam 250 is powered on and active to record the user 240 while viewing the streamed content on the viewing device 245.

Also, the secure content screening research and analysis system 200 is configured to record and capture the web cam video from every validated user simultaneously. Data flow is managed by the second load balancer 235, so that all captured video can be recorded and transmitted back to the secure content screening research and analysis system 200 via the server app 220 and then stored in the database 225. Similarly, the second load balancer 235 farms out the audio in each captured video of user reactions to the chamber audio mixing module 255 which mixes together all of the live audio of the users from their recordings and returns a "room tone" audio to the users as a collective audio chamber, that is a composite of collective viewer reactions which are timed to the events in the streamed content being viewed.

To use the secure content screening research and analysis system and process for securely conducting live audience test screenings and hosting focus groups for media content market research of the present disclosure, producers and filmmakers use the platform to recruit online audience viewers for test screenings. The producer, filmmaker or studio executive can schedule screenings, securely upload and transcode media for hundreds of individual viewers and lock that media to their device and personal account. Once the screening begins, these stakeholders can view live the audience as they watch and react to the content, as well as observe the subsequent focus group. The system software analyses all reactions, including emotion, facial capture, spoken and written replies to questions and creates a working blueprint of how any piece of media impacts and audience, why and where? This is all done automatically, with software because in a new socially distanced world, there is little success in trying to obtain these metrics in-person.

Figure 3:
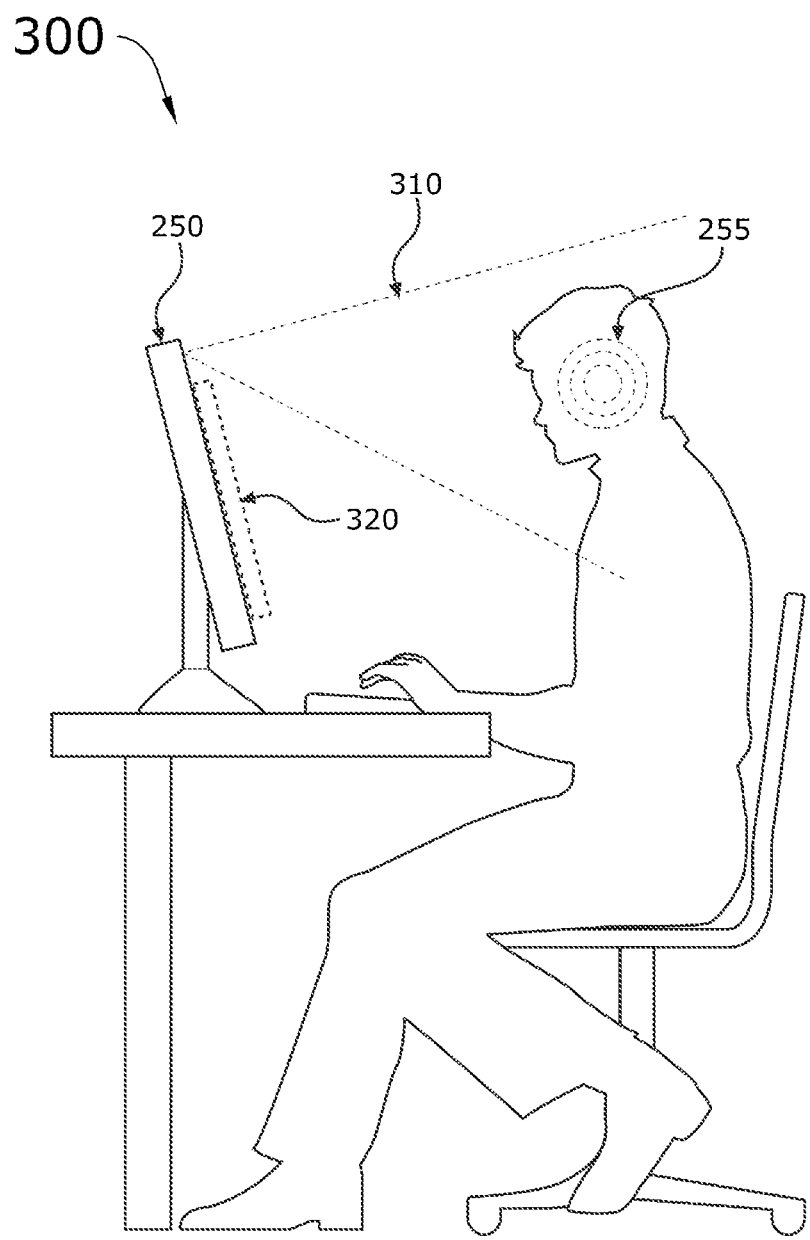
FIG. 3 conceptually illustrates a viewer watching and listening secure streaming media content as a member of live audience being recorded and analyzed for a test screening of the media content in some embodiments.

By way of example, FIG. 3 conceptually illustrates a viewer watching secure streaming media content as a member of live audience being recorded and analyzed for a test screening of the media content 300. As shown in this figure, the user is streaming content to a viewing device from which the user (upon authentication and validation) will view the streaming content item. However, the DRM requires that the web cam 250 is powered on and active, so that the viewer's reactions can be captured as a recorded viewer reaction stream 310 that is transmitted back to the server. Also, the viewer will hear the room tone chamber mixed audio of the collective reactions of all users watching the same content item, which is timed and synchronized according to the content item being played. For example, in synchronization with a timeline for the content item. The streaming content item continues to play for viewing 320 on the viewing device.

Figure 4:
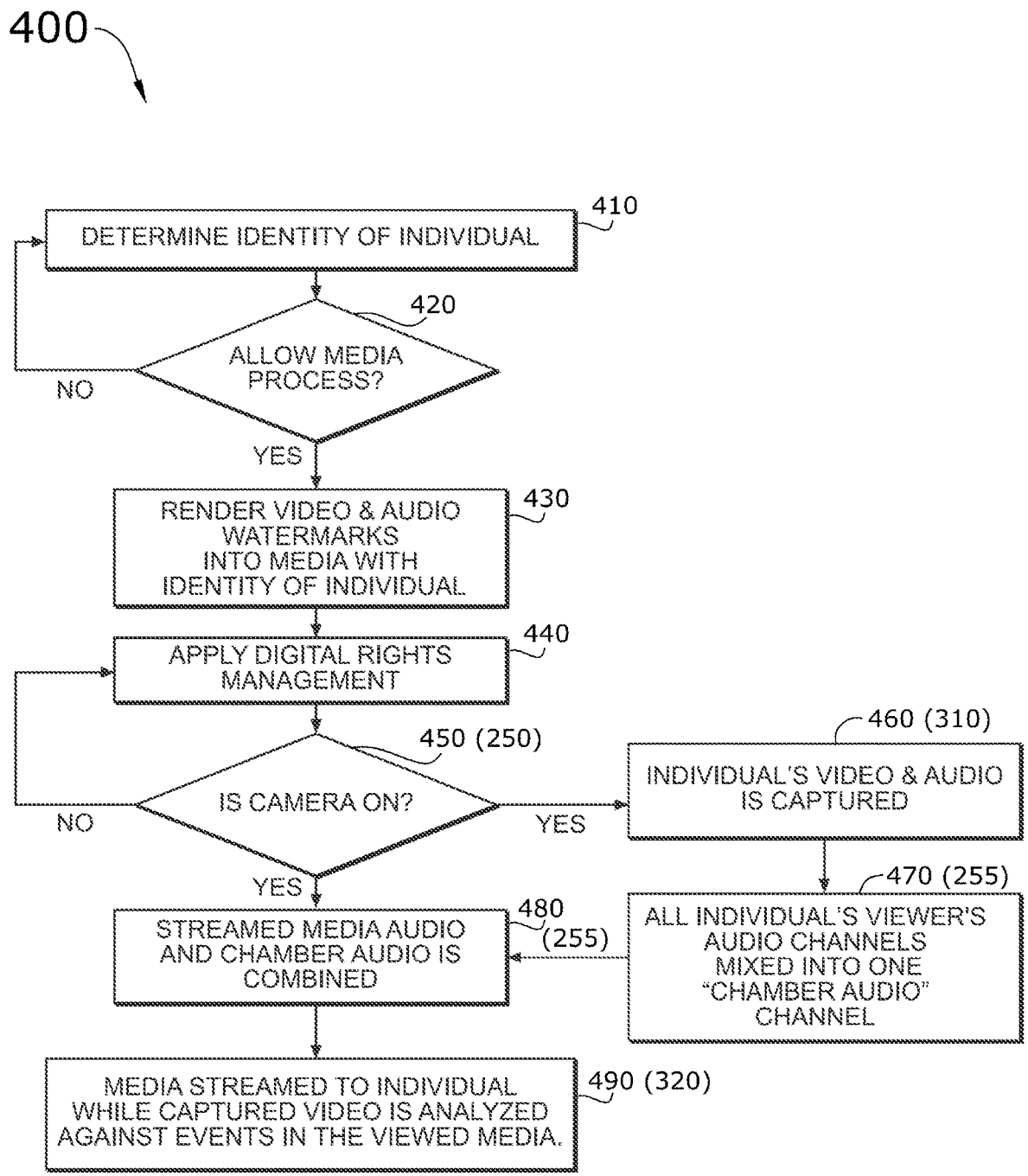
FIG. 4 conceptually illustrates a detailed secure content screening research and analysis process for securely conducting live audience test screenings and hosting focus groups for media content market research in some embodiments.

Now turning to another example, FIG. 4 conceptually illustrates a detailed secure content screening research and analysis process 400 for securely conducting live audience test screenings and hosting focus groups for media content market research in some embodiments. As shown in this figure, the detailed secure content screening research and analysis process 400 starts by determining the identity of the individual (at 410) who is seeking to view the content item. In some embodiments, the detailed secure content screening research and analysis process 400 then determines whether to allow media process to continue to stream the content to the user (at 420). When there is a problem, the detailed secure content screening research and analysis process 400 returns to determine the identity of the individual (at 410). On the other hand, when allowed to continue, the detailed secure content screening research and analysis process 400 renders the video and audio watermarks into the content media item in a way that is unique to the identity of the individual (at 430). Next, the detailed secure content screening research and analysis process 400 applies digital right management (at 440) to require that the web cam of the viewing device on which the individual will view the content is turned on and active. To do so, the detailed secure content screening research and analysis process 400 determines (at 450) whether the camera is on. When the camera is not on, the detailed secure content screening research and analysis process 400 returns to the prior step (at 440) to enforce the DRM requirement of ensuring the web cam is turned on. When the web cam is turned on, the detailed secure content screening research and analysis process 400 captures the individual's video and audio reactions while watching (at 460) and then combines all individual viewers' audio channels into a single, mixed chamber audio channel (at 470), which is then provided back to combine the streamed media audio and the chamber audio together (at 480). Finally, the detailed secure content screening research and analysis process 400 streams the media to the individual while the captured video is analyzed against events in the viewed media.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Furthermore, the functions described above may be implemented in digital electronic circuitry, in computer software (embedded or desktop), firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, compact discs (e.g., CD-ROM, CD-R, CD-RW, etc.), digital versatile discs (e.g., DVD-ROM, DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1 and 4 conceptually illustrate processes in which the specific operations of these processes may not be performed in the exact order shown and described. Specific operations may not be performed in one continuous series of operations, and different specific operations may be performed in different embodiments. Furthermore, the processes could be implemented using several sub-processes, or as part of a larger macro process. Thus, one of ordinary skill in the art would understand that the invention is not to be limited by the foregoing illustrative details, but rather is to be defined by the appended claims.

I claim:

1. A secure content screening research and analysis process for securely conducting live audience test screenings and hosting focus groups for media content market research comprising:
   linking unique video and audio watermarks to a viewer account associated with a registered user;
   using digital rights management ("DRM") to ensure that the registered user has an active web cam operating;
   burning a particular watermark, from among the unique video and audio watermarks linked to the viewer account associated with the registered user, into a video content asset to be streamed for viewing by the registered user; and
   collecting video reactions of the registered user while streaming the video content asset to the registered user for viewing.

2. The secure content screening research and analysis process of claim 1, wherein a unique watermark is linked to each unique viewer account associated with a plurality of viewing users participating in a test screening of the video content asset.

3. The secure content screening research and analysis process of claim 2, wherein burning the watermark into the video content asset comprises burning each unique watermark of each unique viewer account into separate copies of the video content asset when streamed to the viewers.

4. The secure content screening research and analysis process of claim 3, wherein DRM is used to require that the web cam of the user and all other viewing users is powered on and actively able to record viewer reactions while viewing the streamed content from the video content asset.

5. The secure content screening research and analysis process of claim 4, wherein the user and all other viewing users view the streamed content from the video content asset on separate viewing devices that are communicably connected to the web cams that capture the reactions while viewing.

6. A secure content screening research and analysis system comprising:
   a streaming server that provides a video content asset for viewing to a plurality of users based on a digital rights management ("DRM") requirement being satisfied by the users;
   a plurality of viewing devices on which to view the video content asset, wherein each viewing device is associated with a separate user in the plurality of users;
   a plurality of web cams that a communicably connected to the plurality of viewing devices and capture reaction video and audio of the plurality of users while watching the video content asset; and
   a collective audio chamber module that combines reaction audio from each of the users in the plurality of users, combines the reaction audios together, and provides the combined, mixed audio reaction back to the users during viewing of the video content asset.

7. The secure content screening research and analysis system of claim 6, wherein the combined, mixed audio reaction is synchronized to a timeline of the video content asset.

8. The secure content screening research and analysis system of claim 6, wherein the DRM requirement is that each user must have a web cam that is powered on and active and connected to a viewing device on which the user watches the video content asset.

9. The secure content screening research and analysis system of claim 6, wherein the streaming server burns a unique and dynamic watermark into the video content asset for each authenticated and valid user.

10. The secure content screening research and analysis system of claim 9 further comprising a server app and database, wherein the server app authenticates each user to ensure the user is valid, wherein the database stores captured web cam videos from all of the users with reactions while watching the video content asset.

* * * * *